(12) United States Patent
Beers et al.

(10) Patent No.: US 8,205,045 B2
(45) Date of Patent: Jun. 19, 2012

(54) SATISFYING MEMORY ORDERING REQUIREMENTS BETWEEN PARTIAL WRITES AND NON-SNOOP ACCESSES

(75) Inventors: Robert H. Beers, Beaverton, OR (US); Ching-Tsun Chou, Palo Alto, CA (US); Robert J. Safranek, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 718 days.

(21) Appl. No.: 12/168,606

(22) Filed: Jul. 7, 2008

(65) Prior Publication Data
US 2010/0005245 A1 Jan. 7, 2010

(51) Int. Cl.
*G06F 13/16* (2006.01)
(52) U.S. Cl. ......... 711/143; 711/118; 711/141; 711/146
(58) Field of Classification Search .................. 711/143, 711/118, 141, 146
See application file for complete search history.

(56) References Cited

U.S. PATENT DOCUMENTS

| | | | | |
|---|---|---|---|---|
| 5,467,460 | A | * | 11/1995 | Patel ............................ 711/143 |
| 5,537,640 | A | * | 7/1996 | Pawlowski et al. ........... 711/146 |
| 5,797,026 | A | * | 8/1998 | Rhodehamel et al. ............ 712/1 |
| 6,718,444 | B1 | * | 4/2004 | Hughes ......................... 711/155 |
| 6,922,756 | B2 | | 7/2005 | Hum et al. |
| 7,620,696 | B2 | * | 11/2009 | Van Doren et al. ........... 709/217 |
| 2001/0039604 | A1 | * | 11/2001 | Takahashi ..................... 711/141 |
| 2003/0142101 | A1 | * | 7/2003 | Lavelle et al. ................ 345/537 |
| 2004/0122966 | A1 | * | 6/2004 | Hum et al. ..................... 709/232 |
| 2005/0204088 | A1 | * | 9/2005 | Ho et al. ........................ 710/308 |
| 2007/0150664 | A1 | * | 6/2007 | Dombrowski et al. ....... 711/144 |
| 2010/0005246 | A1 | * | 1/2010 | Beers et al. .................... 711/146 |

FOREIGN PATENT DOCUMENTS

| | | |
|---|---|---|
| JP | 2006-516058 A | 6/2006 |
| WO | 2004/061677 A2 | 7/2004 |

OTHER PUBLICATIONS

Office Action Received for German Patent Application No. 10 2009 031 497.0-53 mailed on Jun. 24, 2010, 3 Pages of Office Action and 2 Pages of English Translation.
Office Action Received for Chinese Patent Application No. 200910159840.1 mailed on Feb. 11, 2011, 6 Pages of Office Action. English Translation only.
Office Action Received for Chinese Patent Application No. 200910159840.1, mailed on Mar. 7, 2012, 8 pages of Office Action and 8 pages of English Translation.

(Continued)

*Primary Examiner* — Jae Yu
(74) *Attorney, Agent, or Firm* — Caven & Aghevli LLC

(57) ABSTRACT

A method and apparatus for preserving memory ordering in a cache coherent link based interconnect in light of partial and non-coherent memory accesses is herein described. In one embodiment, when a conflict associated with a partial memory access, such as a partial write, is detected, a write-back phase is inserted at the conflict phase to write-back the partial data to a home agent. Examples messages to initiate a write-back phase at a conflict phase include: an Acknowledge Conflict Write-back message to acknowledge a conflict and provide a write-back marker at the beginning of the conflict phase, a write-back marker message before the conflict phase, a write-back marker message within the conflict phase, a write-back marker message after the conflict phase, and a postable message after the conflict phase.

20 Claims, 13 Drawing Sheets

OTHER PUBLICATIONS

Office Action Received for Japanese Patent Application No. 2009-159801, mailed on Apr. 17, 2012, 3 pages of Office Action and 3 pages of English Translation.

Gotoh, "Intel's incoming CPU interconnect QPI", PC Watch, URL: http://pc.watch.impress.co.jp/docs/2008/0331/kaigai430.htm, Mar. 31, 2008, 8 pages.

* cited by examiner

SATISFYING MEMORY ORDERING REQUIREMENTS BETWEEN PARTIAL WRITES AND NON-SNOOP ACCESSES

FIELD

This invention relates to high speed point to point interconnect links, and in particular, to coherence protocols for implementing a coherent interconnect architecture.

BACKGROUND

When an electronic system includes multiple cache memories, the validity, or coherence, of the data held in the system is maintained to ensure integrity of data operations. Coherency is often accomplished by manipulating data according to a cache coherency protocol. As the number of caches and/or processors increases, the complexity of maintaining coherency increases, which potentially results in a greater number of conflicts between the multiple components of a system.

For example, when multiple components (e.g., a cache memory, a processor) request the same block of data, a conflict between the multiple components is resolved in a manner that maintains validity of the data. Previous cache coherency protocols typically have a single component that is responsible for conflict resolution. However, as the complexity of the system increases, reliance on a single component for conflict resolution can decrease overall system performance.

Generally, there are two basic schemes for providing cache coherence: snooping (now often called Symmetric MultiProcessing SMP) and directories (often called Distributed Shared Memory DSM). The fundamental difference between these two schemes revolves around the placement and access to meta-information; that is, the information about where copies of a cache line are held.

For directory-based schemes, in addition to a fixed place where the uncached data is stored, there is a fixed location, the directory, indicating where cached copies reside. In order to access a cache line in a new way, a node must communicate with the node containing the directory, which is usually the same node containing the uncached data repository, thus allowing the responding node to provide the data when the main storage copy is valid. Such a node, in a directory system, is referred to as a home node.

The directory may be distributed in two ways. First, main storage data (the uncached repository) is often distributed among nodes, with the directory distributed in the same way. Secondly, the meta-information itself may be distributed, keeping at the Home node as little information as whether the line is cached, and if so, where a single copy resides. SCI, for example, uses this scheme, with each node that contains a cached copy maintaining links to other nodes with cached copies, thus collectively maintaining a complete directory.

For snooping caches, the meta-information is distributed with the cached copies themselves, such that each valid copy of a cache line is held by a unit, which is to recognize requests to access the cache line and respond accordingly. Typically, there is a repository where the data is held in an un-cached state, i.e. its original location. Often, an agent or unit responsible for this original location is referred to as a home node. When requesting access to a cache line, a requesting node often broadcasts the address of a requested cache line, along with permissions needed, and nodes holding a copy of the requested cache line respond accordingly.

However, in some of the current coherence and messaging protocols partial reads of cache lines and non-snoop memory accesses, i.e. noncoherent accesses in a coherent architecture, under certain circumstances potentially result in forwarding of invalid data to a requestor. Often these circumstances arise from violations of memory ordering rules within a protocol. As a result, illegal operation may be performed by agents receiving the invalid data, which potentially leads to instability within a system.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific interconnect architectures, specific messages, specific pseudo code, specific interconnect architecture layers, etc. in order to provide a thorough understanding of the present invention. It will be apparent, however, to one skilled in the art that these specific details need not be employed to practice the present invention. In other instances, well known components or methods, such as specific interconnect layer architectural details, specific nonrelevant messages and protocols, specific operational details of processors and caches, etc. have not been described in detail in order to avoid unnecessarily obscuring the present invention.

The method and apparatus described herein are for providing proper memory ordering between partial accesses and non-snoop memory accesses in an interconnect architecture. Specifically, adherence to memory ordering requirements is primarily discussed in reference to an illustrative cache-coherent link based interconnect architecture. However, the methods and apparatus for providing proper memory ordering requirements are not so limited, as they may be implemented with any interconnect architecture.

Embodiment of an Illustrative Interconnect Architecture

Figure 1:
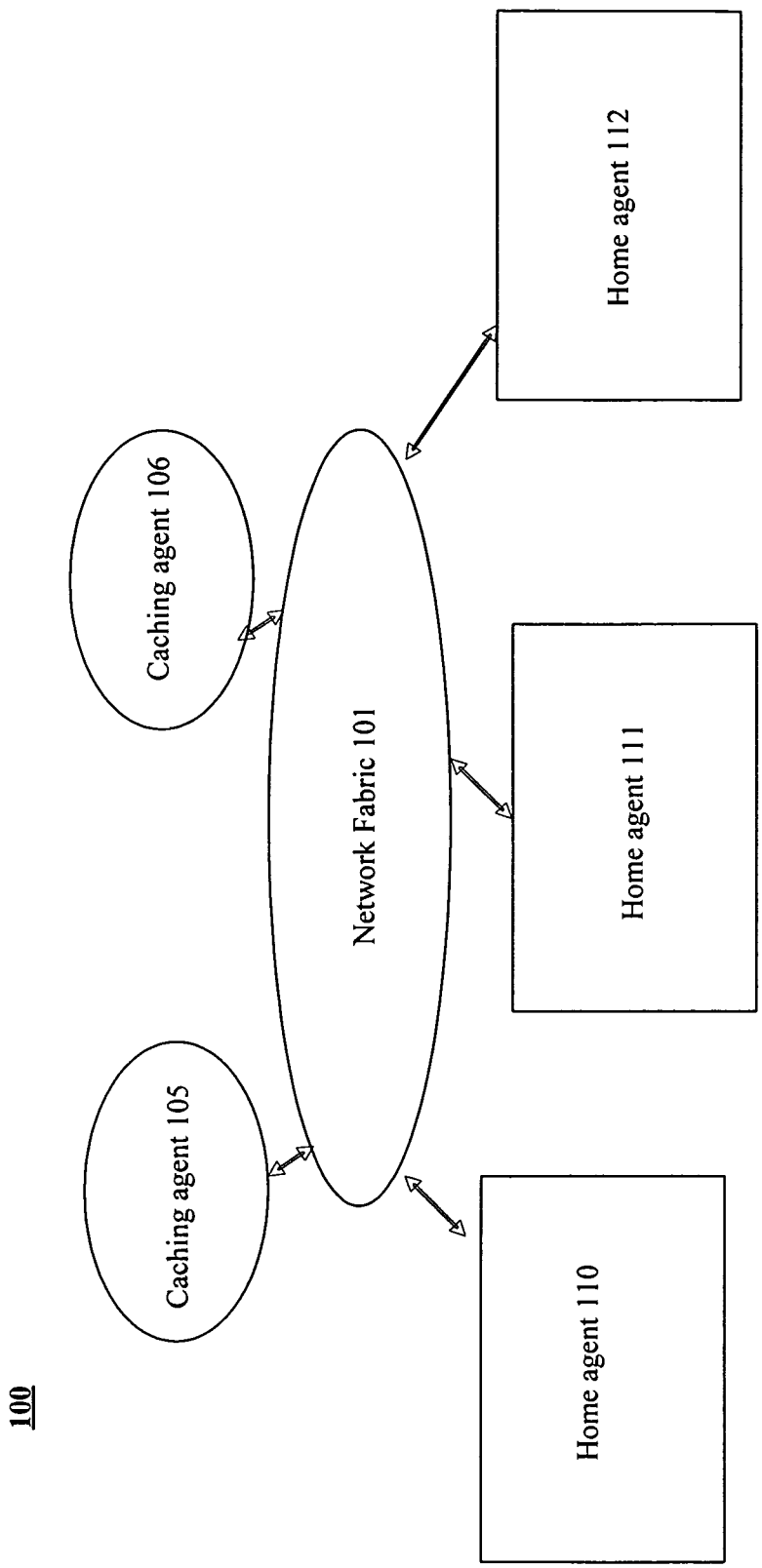
FIG. 1 illustrates an embodiment of a protocol architecture.

FIG. 1 illustrates an embodiment of a high-level simplified protocol architecture. In one embodiment, the protocol architecture is to maintain data consistency between data in caches within the architecture during normal transactions, as well as during conflicting requests. In addition, the protocol architecture, in one embodiment, also provides forward progress for each request, such that each request is satisfied and retired.

A protocol architecture may include any number of nodes or agents. In one embodiment, a node includes a processor that is associated with an internal cache memory, an external cache memory, and/or an external memory. However, a node or agent may refer to any device, or collection thereof, in an interconnect architecture, such as a processor, a memory controller hub, and I/O hub, a generic controller hub, I/O device, a collection of I/O devices, or any other device/component capable of accessing memory. In another embodiment, a node is an electronic system (e.g., computer system, mobile device) interconnected with other electronic systems. Other types of node configurations may also be used.

As illustrated, architecture 100 includes caching nodes/agents 105-106 and home agents 110-112. In one embodiment, home agents 110-112 are to guard memory locations, which are final repositories of a coherent memory space. In other words, agent 110 is a home agent responsible for a plurality of original physical memory locations for data of a coherent memory space. Home agents 110-112 may perform any combination of the following tasks including: tracking cache state transitions from caching agents 105-106, managing conflicts amongst caching agents 105-106, interfacing to memory, providing data and/or ownership, as well as any other known home agent related tasks.

In one embodiment, caching agents 105-106 include agents that are associated with cache memories, such as processors including cache memories and caching I/O proxy entities. Cache agents 105-106 may perform any combination of the following tasks, as well as any other tasks, such as performing read and write requests into coherent memory space, holding cached copies of data from coherent memory space, and supplying cached copies to other peer caching agents. A caching agent or node may also be referred to as a peer agent/node in relation to another caching agent. Although not illustrated specifically in FIG. 1, the protocol architecture may also include non-caching agents, such as an Input/Output (I/O) Hub to participate or witness transactions on behalf of I/O devices.

In one embodiment, caching agents 105-106 and home agents 110-112 maintain data consistency and provide forward progress through exchanging messages over network fabric 101. In one embodiment, fabric 101 facilitates transporting of messages from one agent/node to another agent/node through a point-to-point interconnect network. It is often said that FIG. 1 depicts a cache coherence protocol's abstract view of an underlying network.

In one embodiment, interconnect architecture 100 may incorporate any combination of novel features, as described in the following co-pending applications. For example, U.S. Pat. No. 6,922,756 and entitled "Forward State for Use in Cache Coherency in a Multi-Node System," describes utilization of a Forward cache coherency state (F-state). Furthermore, examples of coherence protocols in various situations are discussed in application Ser. No. 10/833,963, filed Apr. 27, 2004, entitled "A Two-Hop Cache Coherency Protocol," application Ser. No. 10/833,965, filed Apr. 27, 2004, entitled "A Messaging Protocol," application Ser. No. 10/833,977, filed Apr. 27, 2004, entitled, "A Cache Coherence Protocol," application Ser. No. 11/330,977, filed Jan. 11, 2006, entitled, "A Two-Hop Source Snoop Based Cache Coherence Protocol," and application Ser. No. 11/331,301, filed Jan. 11, 2006, entitled, "A Two-Hop Source Snoop Based Messaging Protocol,".

Other examples include, application Ser. No. 10/325,427, filed Dec. 19, 2002, entitled "Speculative Distributed Conflict Resolution for a Cache Coherency Protocol;" application Ser. No. 10/326,234, filed Dec. 19, 2002, entitled "Hierarchical Directories for Cache Coherency in a Multiprocessor System;" application Ser. No. 10/324,711, filed Dec. 19, 2002, entitled "Hierarchical Virtual Model of a Cache Hierarchy in a Multiprocessor System;" application Ser. No. 10/326,232, filed Dec. 19, 2002, entitled "Non-Speculative Distributed Conflict Resolution for a Cache Coherency Protocol;".

Note that the features described in the aforementioned co-pending applications may be incorporated in the embodiments described herein; however, the embodiments described herein are not so limited as they may include additional features, as well as potentially none of the features described above.

Figure 2:
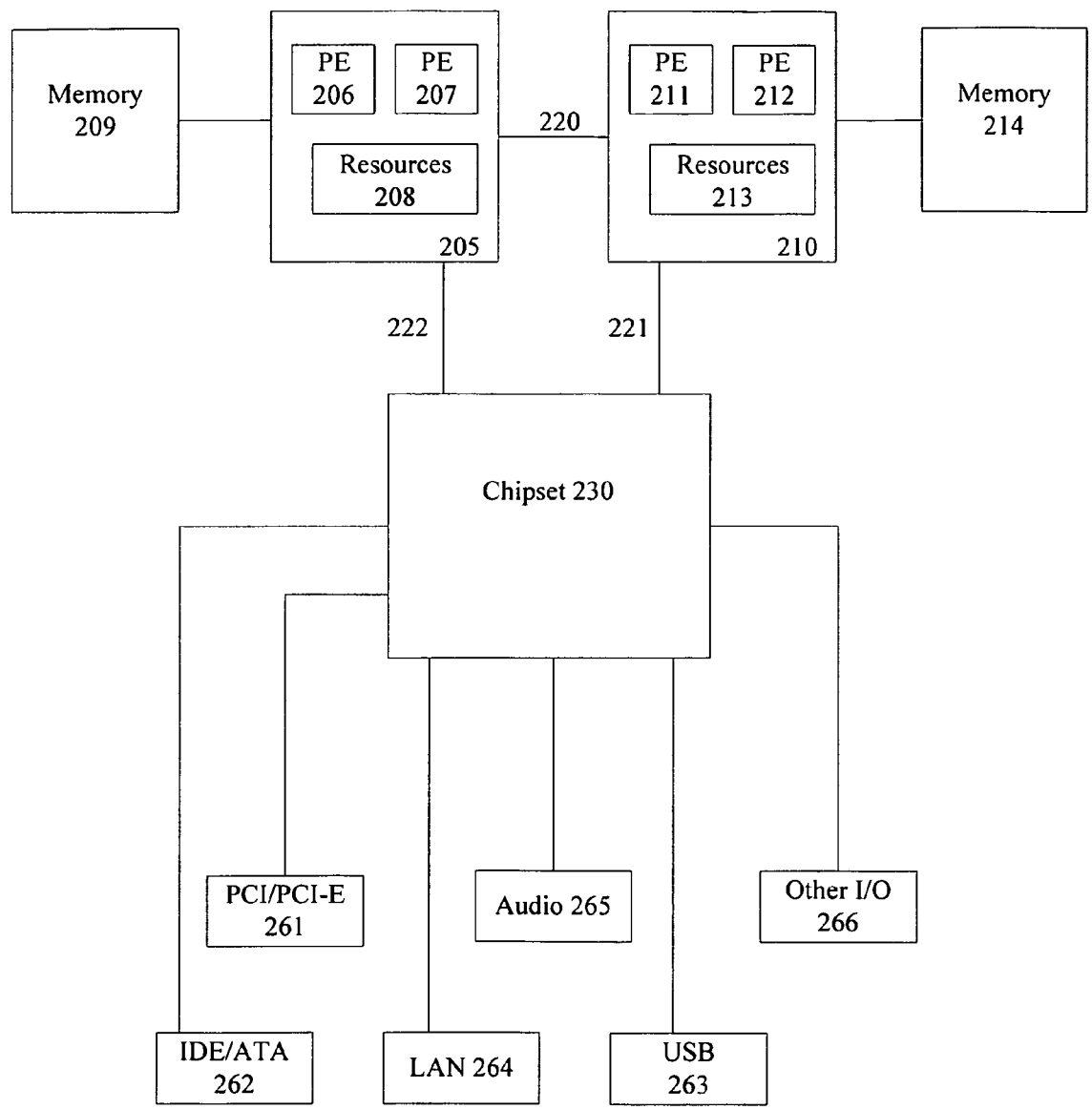
FIG. 2 illustrates an embodiment of a system including multiple processors coupled to a chipset utilizing a point-to-point interconnect.

FIG. 2 illustrates an embodiment of a system including multiple processors coupled to a chipset utilizing a point-to-point interconnect architecture. The system of FIG. 2 may also include several processors, of which only two, processors 205, 210 are shown for clarity. As illustrated, processors 205, 210 each include two processing elements 206-207, 211-212; although, any number of processing elements may be included in processors 205, 210.

A processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. As an example, a physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread, which may also be referred to as a physical thread, typically refers to any logic located on an integrated circuit capable of maintaining an independent architectural state, wherein the independently maintained architectural states share access to execution resources. Therefore, as can be seen, multiple software threads, such as multiple replications of a single-threaded application, in one embodiment, are capable of being executed in parallel on multiple processing elements, which may include a combination of any of the aforementioned processing elements, such as cores or hardware threads.

Also illustrated in processors 205, 210 are resources 208, 213, which typically include registers, units, logic, firmware, memory, and other resources to execute code or interface with other devices. As stated above, some of resources 110 may be partially or fully dedicated to processing elements, while others are shared among processing elements. For example, smaller resources, such as instruction pointers and renaming logic may be replicated for physical threads. Some resources, such as re-order buffers in a reorder/retirement unit, instruction lookaside translation buffer (ILTB), load/store buffers, and queues may be shared through partitioning. Other resources, such as general purpose internal registers, page-table base registers, low-level data-cache, a data-TLB, execution unit(s), and an out-of-order unit are potentially fully shared among threads. In contrast, cores may have dedicated execution resources, while sharing at least a portion of a higher level cache, such as a second level cache (L2).

In one embodiment, resources 208, 213 include a processor pipeline, which may include any number of pipeline stages. Common examples of pipeline stages include an instruction pointer stage, a fetch stage, a decode stage, a drive stages, and allocate stage, a renaming stage, a queue stage, a reorder stage, a schedule stage, a dispatch stage, an execution stage, a memory access stage, and a register access stage. Note this list of stages includes an exemplary non-exhaustive list of processor pipeline stages, as any known pipeline stages may be included in processor 100.

Processors 205, 210 may each also include a memory controller or a local memory controller hub (MCH) to interface with memory 209, 214, accordingly. Memories 209, 214 include any memory device, such as a Random Access Memory (RAM), cache memory, flash memory, or other memory device. In one embodiment, memory 214 includes a higher-level cache memory, while resources 213 includes a low-level cache memory. In another embodiment, memory 209 includes a Dynamic Random Access Memory (DRAM) associated with processor 205, which includes a cache memory to cache data from DRAM 209. Note this is an illustrative embodiment, as memories 209,214 potentially include any style memory device.

In one embodiment, where memories 209,214 include cache memories either included within processors 205,210, or external thereto as illustrated, processors 205,210 are capable of being a home node as well as a peer caching node. For example, when a transaction references a memory location within memory 209, the agent responsible for memory 209, i.e. processor 205, is determined to be a home agent in relation to the transaction and the memory location. Similarly, with a transaction referencing another memory location, such as a location in memory 214, processor 205 is determined to be a peer-caching agent.

As can be seen, point-to-point links 220-224 couple components together in a point-to-point fashion. Physical links 220-224, in one embodiment, each include a bidirectional differential signaling interconnect, such as the physical links associated with a physical layer discussed below in reference to FIG. 3. As a result, processors 205,210 and chipset 230 are capable of direct communication with each other.

Chipset 230 is often a generic reference to multiple integrated circuits, such as a memory controller hub coupled to an input/output (I/O) hub. However, in one embodiment, where agents each include a version of a memory controller hub to interface with memory, chipset 230 refers to an I/O hub or other controller hub. In one embodiment, chipset 230, as discussed above, is a non-caching agent to participate or witness transactions. However, chipset 230 is not so limited, as in other embodiments, chipset 230 is a caching agent including a cache memory and/or a home agent including a memory having original memory location repositories for data.

As illustrated, chipset 230 is also to interface with a plurality of interconnect and I/O devices, such as Peripheral Component Interconnect (PCI) or PCI Express (PCI-E) device 261, Integrated Device Electronics (IDE) or Advanced Transfer Attachment (ATA) device 262, Universal Serial Bus (USB) device 263, Local Area Network (LAN) or Wireless LAN (WLAN) device 264, Audio device 265, and Other I/O device 266, which may also include another interconnect architecture for coupling I/O devices as described herein.

Figure 3:
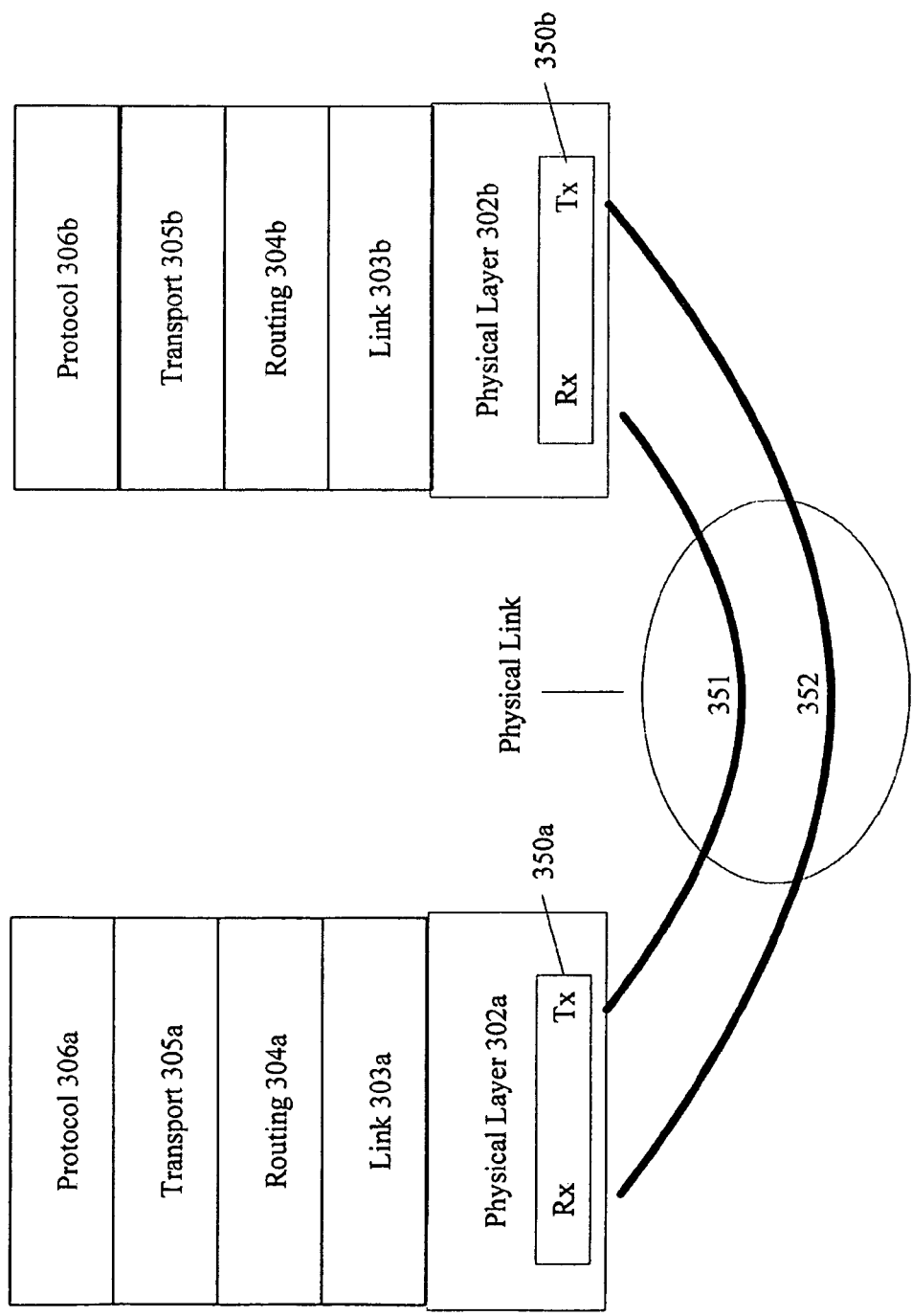
FIG. 3 illustrates an embodiment of a block diagram for a bidirectional interconnect architecture utilizing a layered input/output (I/O) stack.

Referring to FIG. 3, an embodiment of a block diagram for a bidirectional interconnect architecture utilizing a layered interconnect stack is illustrated. Reference to layers of FIG. 3, such as a physical layer 302, includes discussion of a generic layer, which may be implemented in different agents, such as physical layer 302*a* and physical layer 302*b*. As depicted, the interconnect stack is partitioned into five layers, one or more of which are potentially optional based on a design implementation. For example, routing layer 304, in one embodiment, is embedded in the functionality of link layer 303; hence, routing layer, in one embodiment, is not a separate and distinct layer.

In one embodiment, physical layer 302 is responsible for electrical transfer of information on a physical medium. For example, a physical point-to-point link is utilized between link layer entities 303*a* and 303*b*. As an illustrative example, the physical link includes a differential signaling scheme, which includes a bidirectional differential signaling pair 351 and 352. Here, the physical layer is potentially logically divided into an electrical sub-block and a logical sub block, such that the physical layer is to isolate the rest of the stack from the electrical transfer of information and is to communicate with link layer 303.

In one embodiment, link layer 303 abstracts physical layer 302 from upper layers of the stack and provides link related services, such as reliable data transfer and flow control between connected agents/entities and virtualization of a physical channel/interface into multiple virtual channels and message classes. Here, virtual channels may be viewed as multiple virtual networks for use by upper layers of the stack. For example, protocol layer 306 potentially relies on the abstraction provided by link layer 303 to map a protocol message into a message class and, therefore, to one or more virtual channels.

Routing layer 304, in one embodiment, provides a flexible method for routing packets from a source to a destination. As stated above, in extremely simple topologies, routing layer 304 may not be explicit, but rather integrated into the functionality of link layer 303. For example, routing layer 304 may rely on the abstraction of link layer 303 to specify a <port, virtual network> pair to route a packet. Here, routing table information is held to provide routing information for packets.

In one embodiment, transport layer 305 provides end-to-end reliable transmission services. Similar to routing layer 304, transport layer 305 is also optional based on design implementation. As an example, transport layer 305 relies on routing layer 304 services to provide reliable transmission support for protocol layer 306. Within an interconnect architecture, in one embodiment, a subset of components include transport layer 305. As a result, this subset of components define sub-fields of packets relating to transport layer 305, while other components potentially do not define those sub-fields.

Protocol layer 306, in one embodiment, is to implement a higher-level communication protocol between nodes/agents, such as cache coherence, ordering, peer-to-peer communication, interrupt deliver, etc. In other words, protocol layer 306 defines permissible messages, requests, responses, phases, coherence states, etc. for nodes or agents, such as home nodes, peer nodes, caching nodes, and non-caching nodes, accordingly. Examples of messages, such as home node messages, snoop messages, response messages, etc. are discussed below.

Note that discussion of layers, and logic associated therewith, may be coupled in any manner. For example, it may be said that protocol logic is coupled to physical layer, i.e. transmission or receiving logic. Here, as can be seen from FIG. 3, in one embodiment, protocol logic may not be directly coupled to physical layer logic, but rather coupled through other layer logic. Furthermore, the interconnect stack, in one embodiment, is coupled to inner component logic, such as cache control or cache memory logic, to initiate appropriate cache coherence actions.

Overview of an Embodiment of a MESIF Protocol

In one embodiment, the basic Modified Exclusive Shared Invalid Forward (MESIF) protocol provides a protocol similar to a snoop protocol without the potential limitations of a single, serializing bus. Like a snooping cache protocol, MESIF relies on nodes with cached copies of data to maintain coherence. The use of point-to-point links rather than a synchronous, centralized broadcast introduces the problem of time-warp, i.e. the fact that events appear to occur in a different order from the viewpoint of different nodes. As an example, the MESIF protocol handles time-warp through recognition of potential errors due to time-warp, and providing protocol or software solution thereto.

A home node is often associated with an uncached copy of data. As a result, a home node may participate in a transaction relating to data associated with the home node. However, the home node does not have to be included in a "critical path" associated with a transaction, but rather a home node may interject in the transaction to resolve conflicts and time-warp issues. Because of the concurrent-broadcast nature of the scheme, in one embodiment, MESIF achieves the low latency associated with snooping protocols, while acquiring a cacheable copy of the data, in certain cases, in the minimum possible latency: a single roundtrip request-response.

In one embodiment, a basic transaction related to a MESIF protocol involves broadcasting an initial request to all peer nodes as well as a home node. If a copy is cached in state E, F, or M coherency state, it is included in the response. A second message is then sent to the home node, informing it that the request has been satisfied. If the requested line is uncached, or if only S-state copies exist, the second request sent to the home node is used to confirm the previous request, which the home node may have, by now, fetched from its memory. In either case, the home node responds to the second request (and potentially to the first, though they can sometimes be combined) for purposes of synchronization and conflict resolution. Note that the home node may have one or more caches, so it may respond to the initial request just like any other node.

In one embodiment, conflicts are handled in a distributed way. The time-warp problem makes it difficult to detect conflicts, because individual requests can be delayed for an arbitrarily long time. A conflict will be detected, however, if each node monitors for conflicts after making a request. Multiple nodes may potentially detect a conflict, but as an example, at least one of the nodes will detect a conflict. As a result, a response from a node, in one embodiment, potentially includes conflict information.

In one embodiment, a node receiving a copy of the data from a response is allowed to use the data internally immediately upon receipt, but does not make the effects of using the data visible to the rest of the system, i.e. globally visible, until the node has received a confirmation. The confirmation may also include instructions that the requesting node must forward its copy to another node, and perhaps evict the node from its own cache.

Finally, when a node responds to a request from another node by supplying the cached data, the node, in one embodiment, defers other requests it receives for the same cache line until the node receives a response from the Home node acknowledging the fact that the node forwarded the data, thus assuring that all nodes observe the same order of transfer of the (possibly writable) cache line.

The home node, as stated above, is a repository for uncached data, but the home node also may include processor and a cache. Here, when the home node processor misses the cache, the home node broadcasts requests to all other (peer) nodes, and the home node handles the request internally as it would any other request arriving for the home node. Note that this is a special case, in that the home node does not explicitly send messages to itself (the Home node). In addition, when an external request arrives for data that is cached locally, the home node responds appropriately.

The disclosed message protocol defines a set of allowed messages between coherence (cache and home) agents, non caching agents, as well as other agents (memory controllers, processors, etc). A coherence protocol uses the messages as words and grammar in an algorithm to express a coherent thought. This algorithm sensibly orders requests, resolves conflicts, and describes interactions between caching agents. Although, a MESIF protocol is described above, the MESIF cache coherence protocol is not required to be utilized. For example, the Forward state may not be utilized, which results in utilization of the known MESI protocol. Furthermore, note the discussion above includes an exemplary overview of an embodiment for a MESIF protocol. Consequently, various components described above may differ in separate embodiments. A non-exhaustive exemplary list of potential messages utilized in a messaging and/or coherence protocol are included below.

Snoop Messages

In one embodiment, snoop messages are directed towards caching agents, such as peer caching agents. Snoop messages typically do not include a home node identifier (ID), such that they are routed to peer caching agents, but not to a home node.

Snoop Data (SnpData): This is a snoop to get data in E, F, or S states.

Snoop Invalidate Own (SnpInvOwn): This is a snoop to get data in E or M states. In one embodiment, a peer agent is to provide the data in response to holding the data in its local memory in the E or M state.

Snoop Invalidate Invalid to Exclusive (SnpInvItoE): This is a snoop to invalidate a peer caching agent and to flush any M state data to the home node.

Snoop Invalidate X to Invalid (SnpInvXtoI): This is a snoop to invalidate a peer caching agent and to flush any M state data to the home node.

Home Messages

The following messages are associated with a home node. As an example, some of the following are request messages to a home node. In fact, note the similarity between some of the snoop messages and home messages. However, these similar messages often differ, in that, a message to a home node includes a home node ID to be routed to the home node, while a broadcasted peer node message may not include a reference to the home node.

Other home messages include home write back marker messages. Here, data may be sent separate via WbData messages, which may be received in any order in regards to the marker messages. Other examples of home messages included below are home snoop response messages from caching agents to home agents and home acknowledgement of conflict messages to signal a beginning of a conflict phase.

Read Data (RdData): This is a request for data in an Exclusive (E) state, as well as potentially a Forward (F) state or an S state depending on the embodiment.

Read Invalidate Own (RdInvOwn): This is a request for a cache line in M or E states.

Invalidate Invalid to Exclusive (InvItoE): This is a request for a cache line without data.

Non-Snoop Read (NonSnpRd): This is a request to perform a noncoherent read from memory.

Non-Snoop Write (NonSnpW): This is a request to perform a noncoherent write to memory.

WriteBack Modified to Invalid, Shared, or Exclusive (WbMtoI, WbMtoS, and WbMtoE): This is a request to write a cache line in an M state back to memory and transition the cache line state to an Invalid state, a Shared state, or an Exclusive state, accordingly. In one embodiment, these messages are marker messages to indicate data is to be sent, while the data is actually carried via a separate message, such as a WB*Data* message.

Response Invalid or Shared (RspI or RspS): Peer Agent is left with line in Invalid State or in an S state, accordingly.

Response Forward Invalid or Shared (RspFwdI or RspFwdS): Peer has sent data to the requester and the line is left in an Invalid or Shared State, accordingly.

Response Forward Invalid or Shared Writeback (RspFwdIWb or RspFwdSWb): Peer has sent data to the requester and a WbIData to a home node, and the line is left in the Invalid or Shared state, accordingly Response Invalid or Shared Writeback (RspIWb or RspSWb): Peer has evicted the data with an in-flight WbIData message to the home, and has not sent any message to the requestor.

Response*Writeback Post (Rsp*WbPost): Peer has evicted the data with an in-flight Wb*Data message to the home, and has not sent any message to the requestor. Furthermore, in one embodiment, a sender of an AckCnflt message associated with the Rsp*WbPost message is not deallocated in response to receiving a Cmp_Fwd* message. As an example, a home agent sends a complete message in response to committing the partial data to memory.

WbPost: Peer has evicted the data with an in-flight Wb*Data message to the home. Furthermore, in one embodiment, a sender of the WbPost message is not deallocated in response to receiving a Cmp_Fwd* message. Here, the sender waits for a completion from a home node. As an example, a home agent sends a complete message in response to committing data to memory.

Response Conflict (RspCnflt): Peer is left with line in Invalid state and the peer has a conflicting outstanding request.

Acknowledge Conflict (AckCnflt): Acknowledge receipt of a data completion/grant and completion/force acknowledge conflict.

Acknowledge Conflict Write-back Invalid (AckCnfltWbI): In one embodiment, it signals an AckCnflt, as described above. Furthermore, in one embodiment, the message further signals a write-back of partial data, which may be included in a separate WbIData message, as described below. Moreover, the cache line associated with the data is transitioned to an Invalid state.

Non-Data Response Messages

In one embodiment, non-data response messages include grant messages to grant ownership for a line without sending data. Non-data response messages may also include completion messages to signal completion and potentially extract data from an owner under conflict conditions.

Grant_Completion (GntCmp): Grant Exclusive ownership without data

Grant Force Acknowledge Conflict (Gnt_FrcAckCnflt): Grant Exclusive ownership without data plus a force acknowledge conflict.

Completion (CMP): all snoop responses gathered and no conflict detected.

Force Acknowledge Conflict (FrcAckCnflt): snoop responses gathered, for an acknowledge conflict.

Complete Forward Code (Cmp_FwdCode): Complete request, forward the line in Forward or Shared State to the requester, and invalidate local copy or leave it in the Shared state.

Complete Forward Invalidate Own (Cmp_FwdInvOwn): Complete request, forward the line in Exclusive or Modified State to the requester, and invalidate local copy.

Data Response Messages

DataC_*: Data in corresponding MESIF state.

DataC_*_Cmp: Data in corresponding ESIF state with a completion.

DataC_*_FrcAckCnflt: Data in corresponding ESIF state with a FrcAckCnflt.

Wb*Data: Writeback data, transition to corresponding E, S, or I state.

WbIDataPtl or WbEDataPtl: Writeback of partial data, transition to corresponding Invalid or Exclusive state.

Wb*DataPtlPost: Writeback of partial data, transition to corresponding coherency state. Furthermore, in one embodiment, a sender of an AckCnflt message associated with the Wb*DataPtlPost message is not deallocated in response to receiving a Cmp_Fwd* message. As an example, a home agent sends a complete message in response to committing the partial data to memory.

Non-Snoop Write Data (NonSnpWrData): This is a non-coherent write to memory.

Non-Snoop Write Data Partial (NonSnpWrDataPtl): This is a noncoherent write of partial data.

Figure 4A:
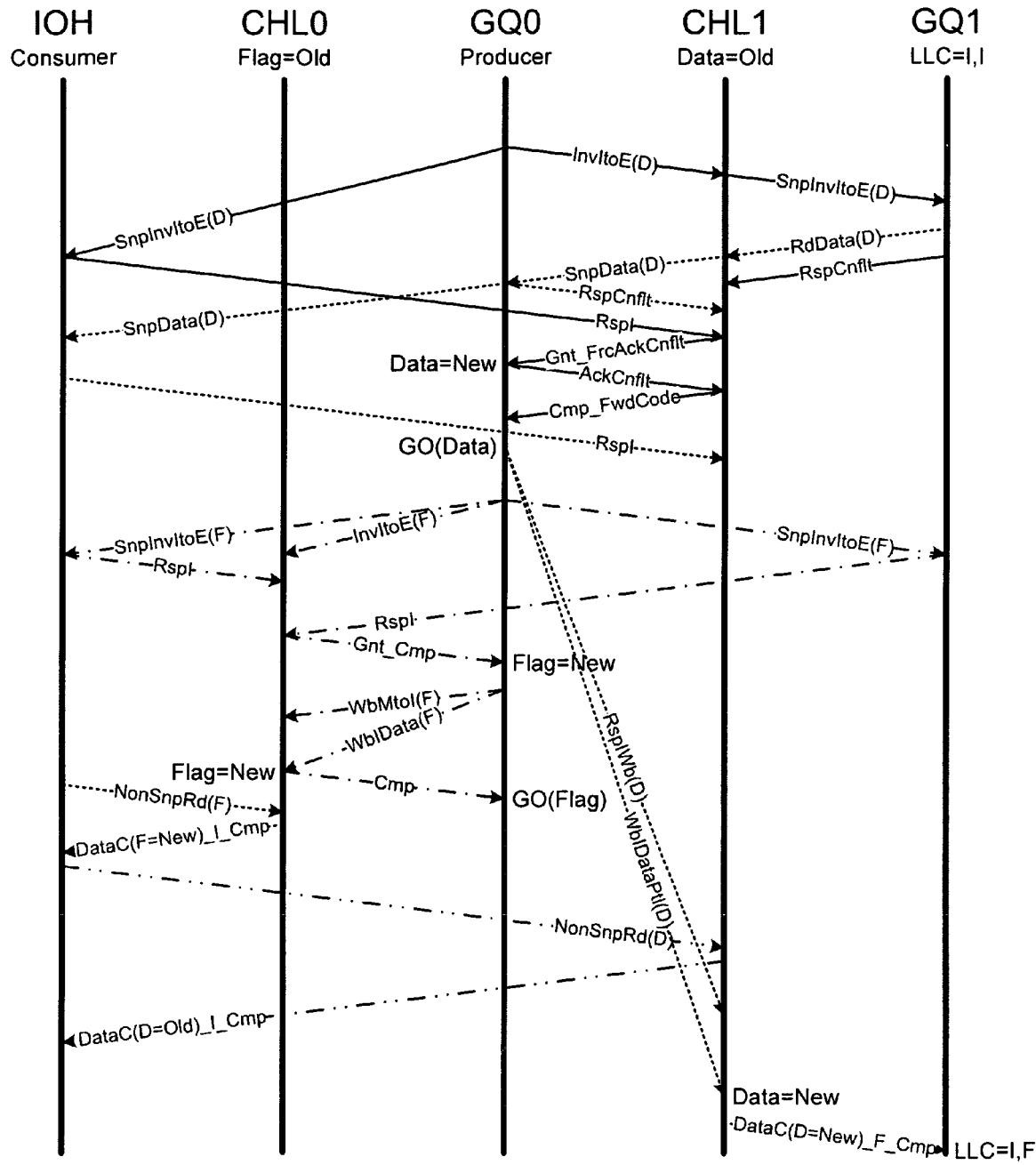
FIG. 4a illustrates an embodiment of a protocol diagram for a messaging protocol between multiple nodes that potentially results in a memory ordering violation.

Turning to FIG. 4a, an embodiment of a protocol diagram for messaging between multiple nodes potentially resulting in memory ordering violations is illustrated. As depicted, the protocol diagram depicts five nodes, i.e. an Input/Output Hub (Consumer), a home node 0 for "Flag" (CHL0), a producer node (GQ0), a home node 1 for "Data" (CHL1), and another caching agent (GQ1) participating in multiple transactions. Note that the number and types of agents depicted are purely illustrative, as an interconnect architecture is extremely flexible and may include any number or style of agents.

Here, the producer, GQ0, initiates a request for a cache line associated with Data. An InvItoE(D) message is transmitted to home node 1, CHL1, and SnpInvItoE(D) messages are transmitted/routed to peer agents (Consumer, GQ1). However, during this transaction, GQ1 initiates a separate transaction with a read request for Data. Note that both agents GQ1 and GQ0 detect a conflict in this instance, which is reflected by the RspCnflt messages from peer agents GQ0 and GQ1 to home agent CHL1. After home node CHL1 receives outstanding messages, it transmits a Gnt_FrcAckCnflt to GQ0 to grant ownership and force an acknowledge of the conflict.

At this point, GQ0, as the producer, performs a partial write to Data, i.e. Data=New, and transmits an AckCnflt message to acknowledge the Gnt_FrcAckCnflt message. In one embodiment, an AckCnflt also indicates a start of a conflict phase of a transaction, while a completion associated with the AckCnflt denotes the end of the conflict phase. Home node CHL1 then transmits a Cmp_FwdCode message to push Data back to home node CHL1. However, the writeback of partial Data, i.e. RspIWb(D) and WbIDataPtl(D) messages, is delayed for any number of reasons, such as channel or routing delay.

In the meantime, having updated data, having provided the partial data response to home node CHL1, and being de-allocated from the partial write to Data transaction by the Cmp_FwdCode from home node CHL1, GQ0 now initiates a write to Flag, i.e. InvItoE(F) message to CHL0 home node and corresponding snoops to peer agents IOH and GQ1. Here, GQ0 obtains ownership of the cache line for Flag, i.e. Gnt_Cmp from the home node CHL0, and updates the Flag to New. Furthermore, the new value of Flag is written back to the home node CHL0, i.e. WbMtoI(F) and WbIdata(F). Often, this scenario of Data and Flag is utilized in I/O operations, where one agent updates data, and then sets a flag to let another agent know the data is updated and ready for retrieval.

Therefore, the IOH is potentially spinning on Flag, checking Flag periodically or after an amount of time, to determine when data is ready to be retrieved. Consequently, the IOH performs a non-snoop, or non-coherent, read of Flag, i.e. NonSnpRd(F). Here, the read from memory of Home node CHL0 retrieves a Flag=New value indicating data is ready to be retrieved. The IOH, no longer spinning on Flag, initiates a NonSnpRd request of Data. However, when the NonSnpRd is received, Data still holds an OLD value, since the writeback of Data=New from GQ0 was delayed. Consequently, the consumer, IOH, receives invalid Old Data, but believes Data to be valid, which potentially results in illegal operation or execution.

Note the example of Flag and Data is purely illustrative to depict a potential circumstance where invalid memory ordering of partial memory accesses and non-coherent memory accesses potentially leads to invalid/illegal operation. As a result, the embodiments described herein may be utilized with any partial memory access scenario.

Figure 4B:
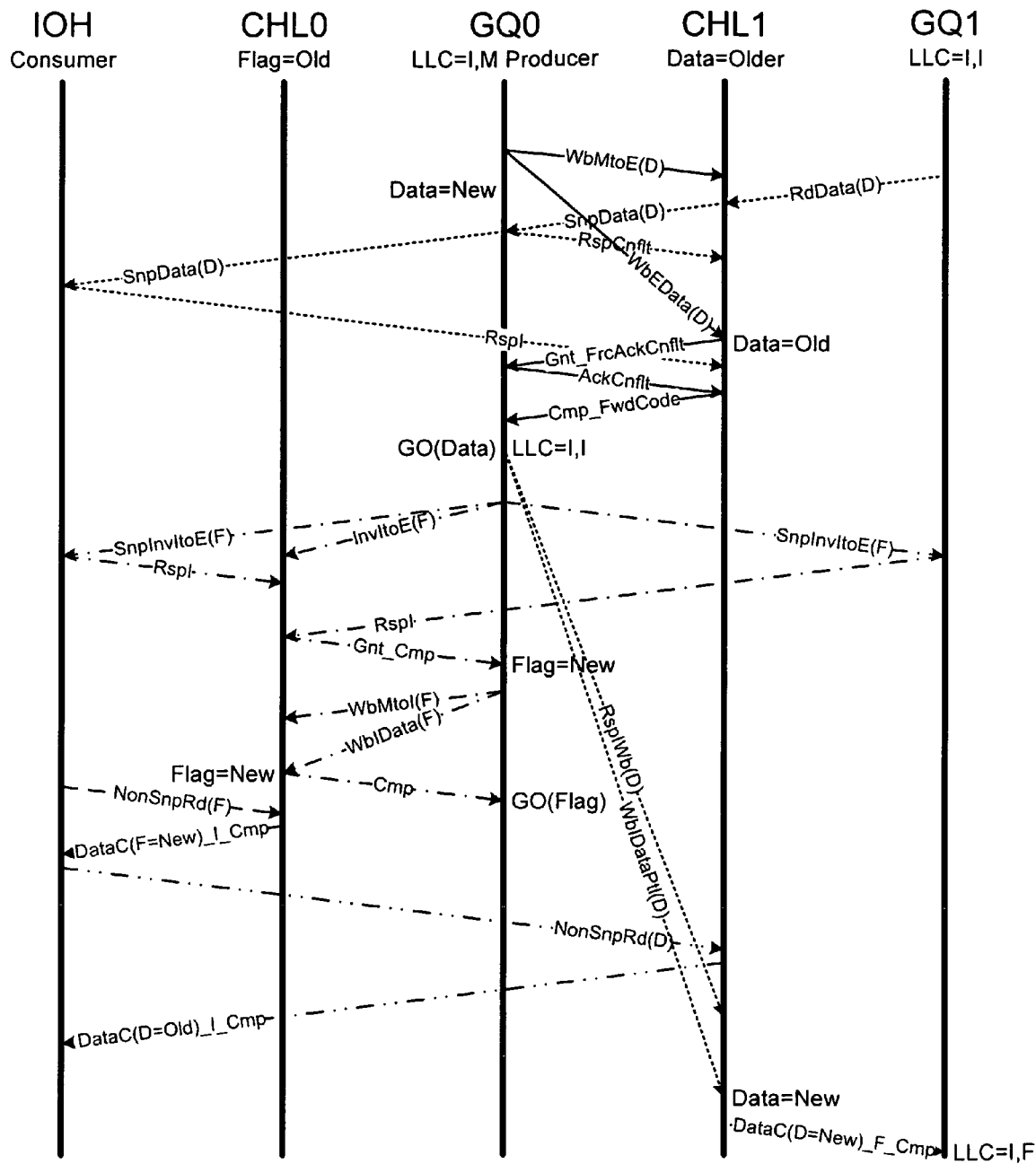
FIG. 4b illustrates another embodiment of a protocol diagram for a message protocol between multiple nodes that potentially results in a memory ordering violation.

Similarly, FIG. 4b illustrates another embodiment of a protocol diagram for messaging between multiple nodes potentially resulting in memory ordering violations. Here, GQ0 holds the cache line for Data in a modified state instead of requesting the line, as discussed above. As a result, before writing to Data, GQ0 is to push the modified copy back to home node CHL1 with WBMtoE(D) and WbEData(D) and transition to an Exclusive state. GQ0 then performs a partial write to Data in its local memory. However, as above, GQ1 issues a read request for Data. Note, unlike above, only GQ0, not GQ1 detects the conflict. As stated above, multiple nodes/agents may detect a conflict, but the protocol, in one embodiment, relies on at least one node to detect the conflict.

As a result, GQ0 provides a RspCnflt message to home node CHL1 for resolution. A similar transition into a conflict phase occurs with identical response, i.e. a Gnt_FrcAckCnflt from the home node CHL1, an AckCnflt from GQ, a Cmp_FwdCode from CHL1, and then a writeback of Data with messages RspIWb(d) and WbIDataPtl(D), which are delayed as before. Flag is then updated to New and the IOH performs a non-coherent read from memory of Flag. Believing the Data to be ready for retrieval due to Flag being updated to New, the IOH requests a non snoop read of Data. As above, the IOH receives invalid Old Data, instead of the updated New Data in response to the partial write of GQ0, the non-coherent read of Data, and the delay of the writeback of New data.

Therefore, in one embodiment, a write-back phase, which may include a single or multiple messages, is inserted at a conflict phase associated with a partial memory access, such as a partial write, to push partial data back to a home node. As a first example, an AckCnfltWbI message to acknowledge a conflict and provide a write-back marker is generated at a conflict phase. As another example, a write-back phase utilizing write-back messages is inserted before an AckCnflt message is provided to a home node. As yet another example, the write-back phase utilizing write-back messages is included within the conflict phase, i.e. after an AckCnflt message. As a final illustrative example, the write-back phase is included within or after a conflict phase utilizing a Rsp*Post, a WbDataPost message, or a WbPost message, such that a sender of the AckCnflt message is not deallocated after receiving a completion message for the conflict phase.

These examples of a write-back phase being initiated at a conflict phase are purely illustrative, as any known messages or methods of pushing partial data back to a home node upon a conflict may be utilized. However, to further the discussion, these illustrative examples are discussed in more detail below in reference to FIGS. 5a-7c.

Figure 5A:
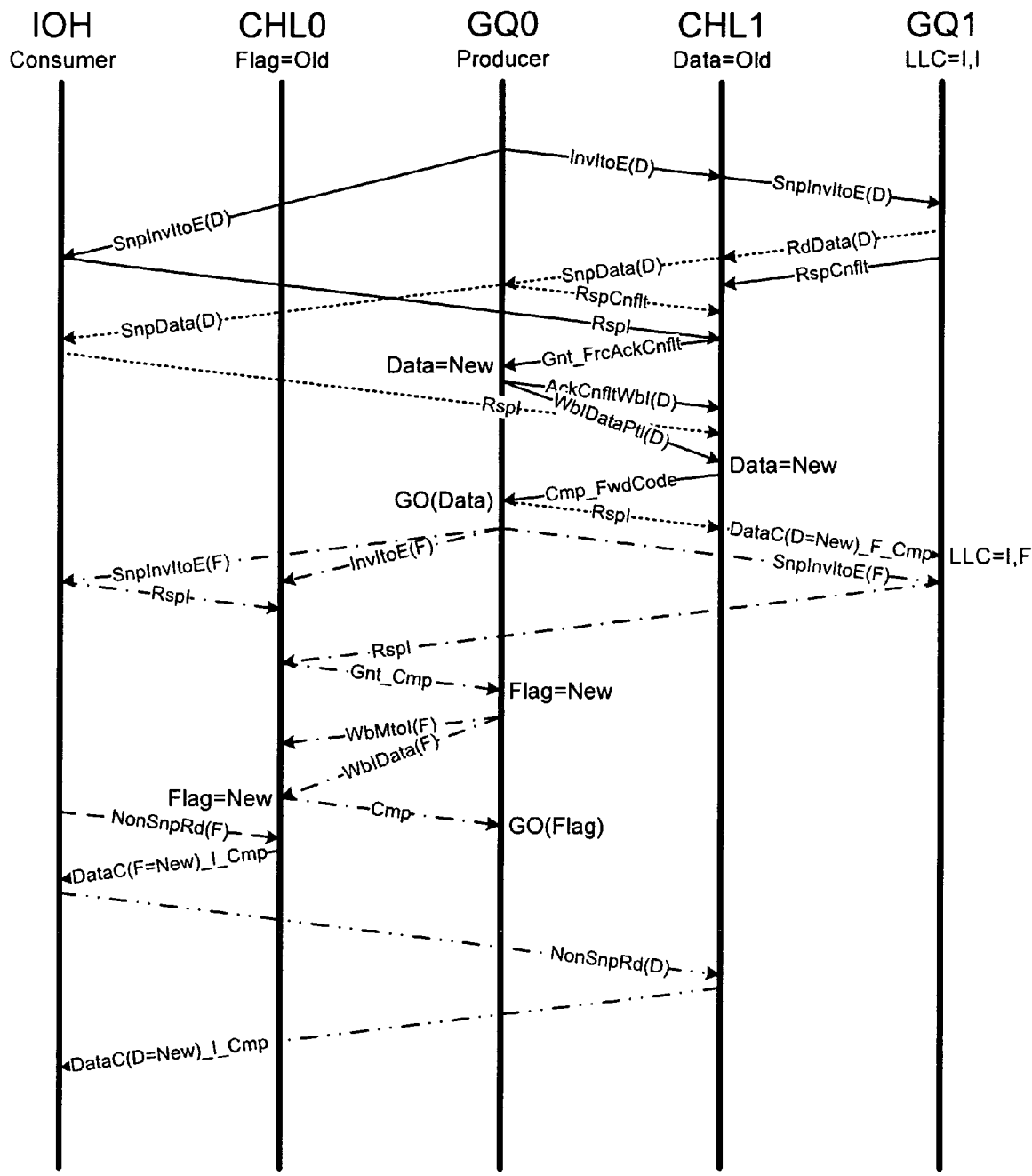
FIG. 5a illustrates an embodiment of a protocol diagram for a messaging protocol including a message in a conflict phase to adhere to proper memory ordering requirements.

Turning to FIG. 5a, an embodiment of a protocol diagram utilizing a conflict acknowledgement and data write-back message at a start of a conflict phase is illustrated. The scenario of FIG. 5a is similar to that of FIG. 4a, in that GQ0 requests exclusive ownership of a cache line associated with Data, GQ1 issues a read request for Data, a conflict is detected by GQ0 and GQ1, and the home node CHL1 associated with Data transmits a Gnt_FrcAckCnflt message to GQ0. However, in one embodiment, instead of the producer providing just an AckCnflt message to acknowledge receipt of the Gnt_FrcAckCnflt from home node CHL1, a combined AckCnfltWbI(D) message is generated and transmitted by GQ0. Here, the AckCnfltWbI message is to serve a dual purpose, i.e. acknowledgement of the Gnt_FrcAckCnflt and a marker to home node CHL1 that Data is to be provided in a data message, such as WbIDataPtl(D).

In other words, in response to producer GQ0 performing a partial write to Data and receiving a conflict message from home node CHL1, GQ0 is to perform a write back of the partial data to the home node, i.e. performing a writeback phase at the conflict phase. Previously, in FIG. 4a, a writeback was performed later after a conflict phase was completed. Here, GQ0 was de-allocated by the end of the conflict phase with Cmp_FwdCode, and as a result, the next transaction is able to begin without regard of when the partial Data reaches home node CHL1, which lead to the acquisition of invalid data by the IOH.

In contrast, as can be seen in FIG. 5a, the Cmp_FwdCode is not transmitted until the partial data is pushed back to home node CHL1, or committed to memory therein. Consequently, GQ0 is not de-allocated and the next transaction to update Flag does not start until after Data is updated at CHL1 and the Cmp_FwdCode message is received at GQ0, which results in ensuring that Data is updated before Flag is updated. Therefore, when IOH performs the non-coherent read of Flag and then Data, the Data at CHL1 is guaranteed to be the latest copy from GQ0.

Figure 5B:
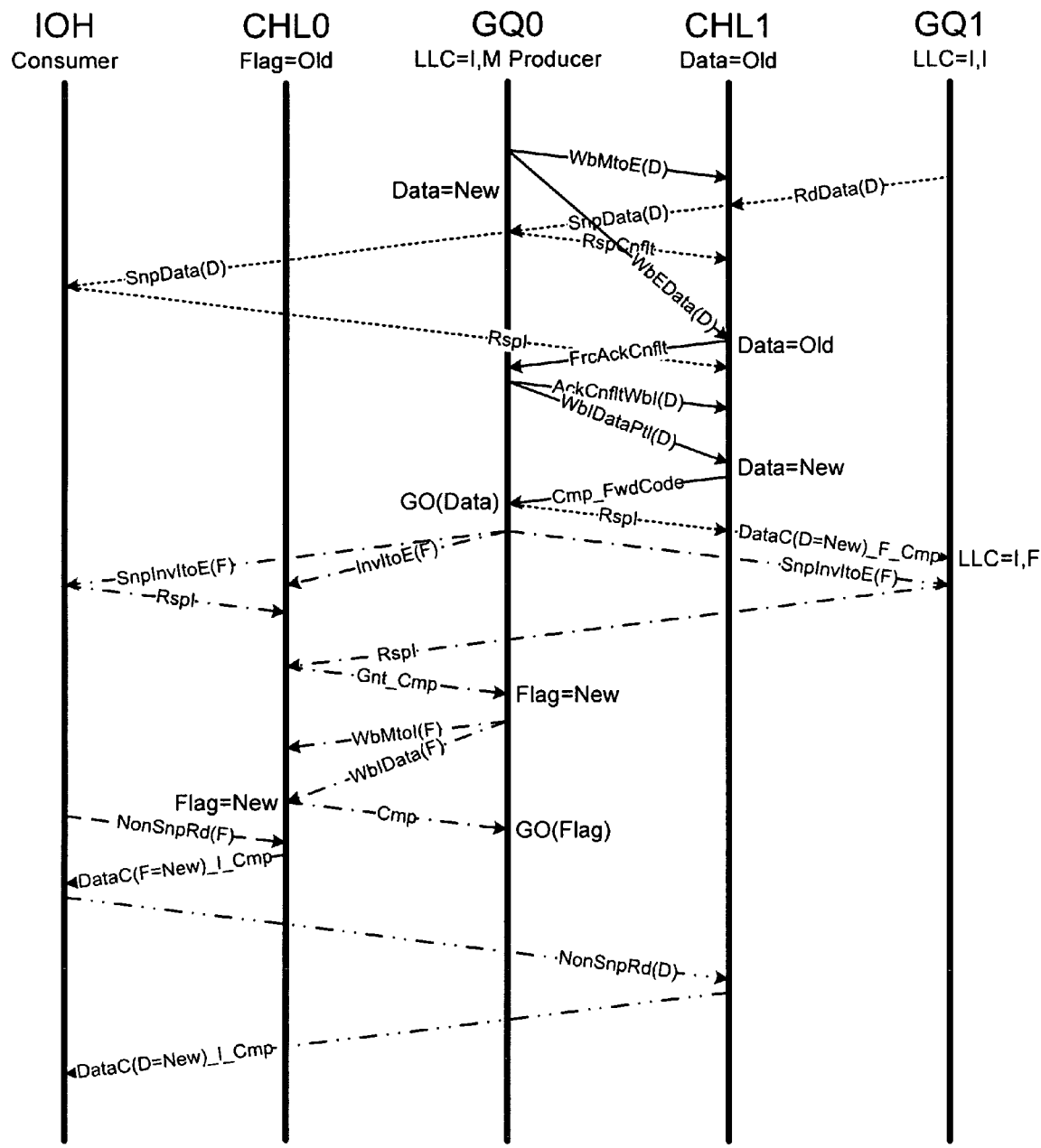
FIG. 5b illustrates another embodiment of a protocol diagram for a messaging protocol including a message in a conflict phase to adhere to proper memory ordering requirements.

Similarly, in reference to FIG. 5b, another embodiment of a protocol diagram utilizing a conflict acknowledgement and data write-back message at a start of a conflict phase is illustrated. Here, the protocol flow is similar to that of FIG. 4a, in that GQ0 holds a modified Old copy of Data, writes back the Old copy back to home node CHL1, updates Data to a new value, GQ1 issues a read request for Data, a conflict is detected, and a force acknowledge of conflict message is generated and transmitted by home node CHL1 to producer GQ0.

Here, as discussed in reference to FIG. 5a, in one embodiment, an AckCnfltWbI message is provided to home node CHL1, since GQ0 performed a partial write to Data and a conflict message is received by GQ0 from home node CHL1. The AckCnfltWbI message informs the home node that the conflict is acknowledged and that a data message, WbIdataPtl message, is to provide Data to home node CHL1. Note from the discussion above of potential time-warp that WbiDataPtl may potentially be received before AckCnfltWbI. However, through operation of the protocol, CHL1 observes both in a manner that is consisted with the protocol flow. As a result, the Flag transaction is not initiated until GQ0 receives the completion signal from home node CHL1, which is sent only after receiving the partial data. Therefore, as discussed above, the IOH spins on Flag until it is updated to New, which is now ensured to be after Data is updated at CHL1, which results in the proper memory ordering and valid Data being provided to the IOH.

Figure 6A:
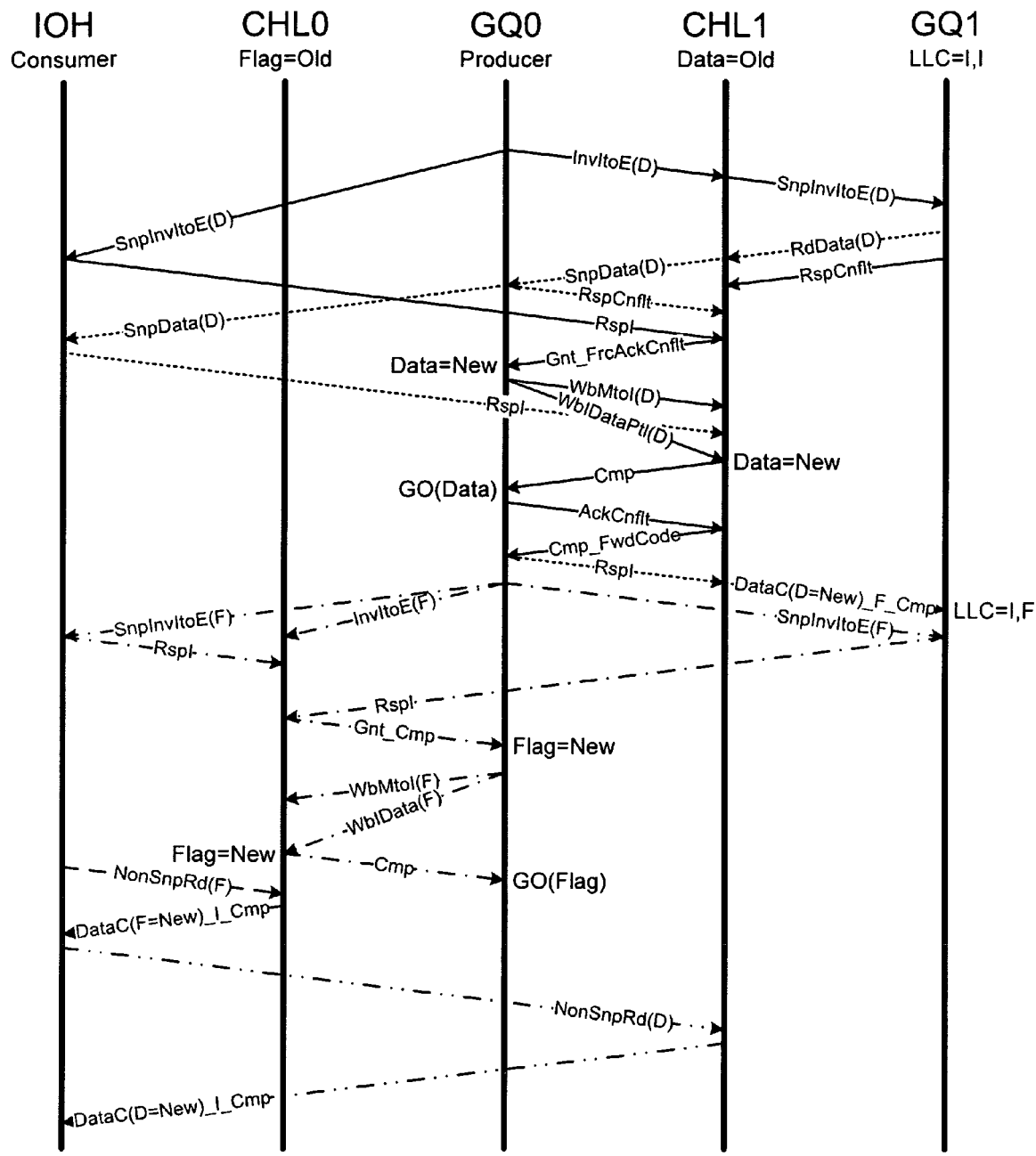
FIG. 6a illustrates an embodiment of a protocol diagram for a messaging protocol including a data writeback phase inserted before a conflict phase to adhere to proper memory ordering requirements.

Referring next to FIG. 6a, another embodiment of a protocol diagram utilizing a write-back phase at a conflict phase is illustrated. As discussed above, the protocol of FIG. 6a is, at least initially, similar to that of FIG. 4a. In contrast, in response to receiving the Gnt_FrcAckCnflt message from home node CHL1, producer agent GQ0 performs the partial write to Data and writes-back the partial data to home node CHL1 utilizing a WBMtoI data marker message and a WbIDataPtl data message. After GQ0 receives the completion message for the write-back, i.e. after the partial Data is committed at CHL1 and the completion message is sent by CHL1, GQ0 then transmits the AckCnflt message to home node CHL1 and home node CHL1 transmits the Cmp_FwdCode message to GQ0.

As discussed above, the Flag write transaction is not started until after the Cmp_FwdCode message is received by GQ0, which is not sent until after new Data is pushed back to CHL1. Consequently, the IOH does not read Data until Flag is updated to New, while Flag is not updated until Data is committed at CHL1. In other words, the memory ordering of data being globally observed before Flag is updated is enforced.

Figure 6B:
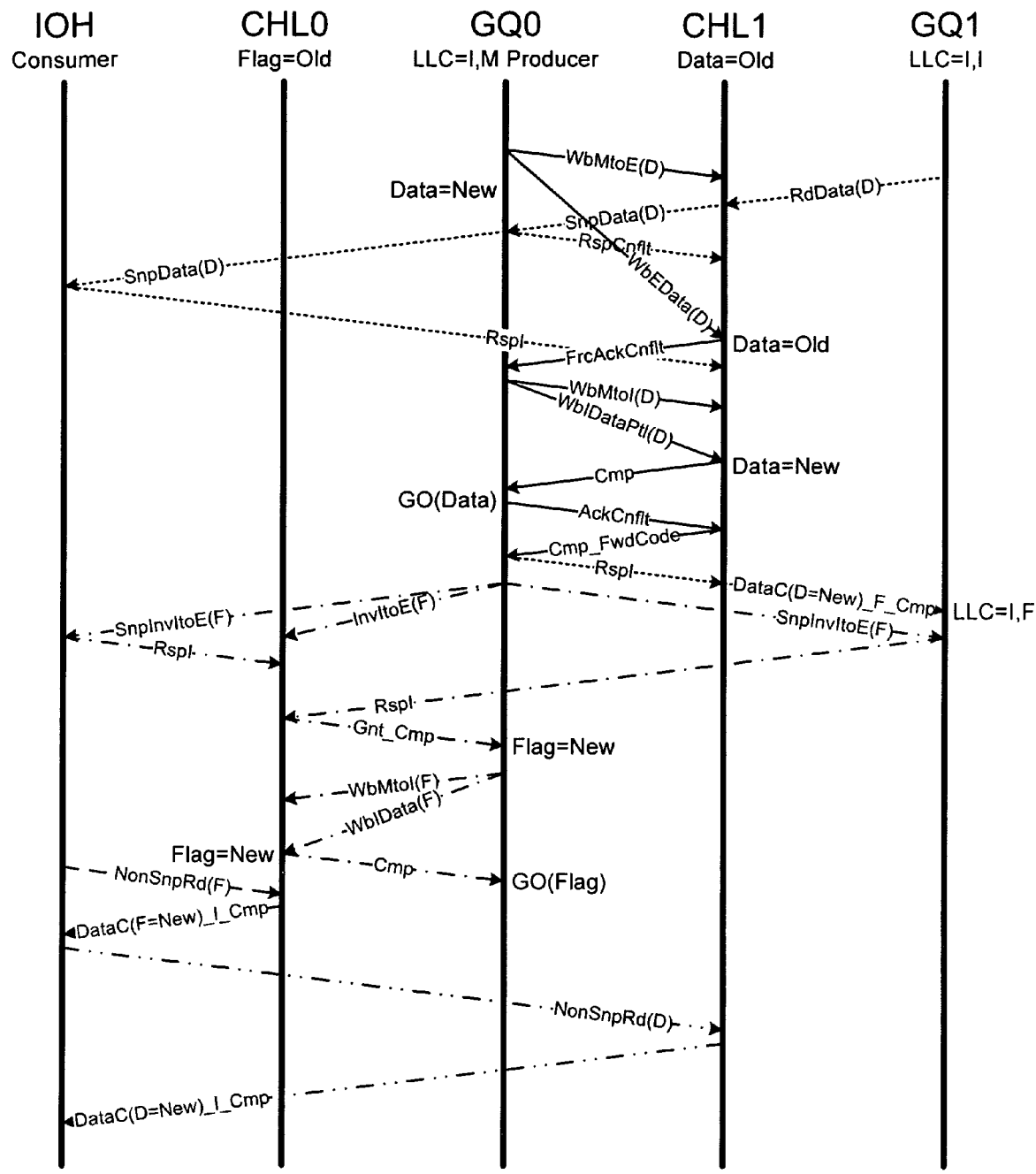
FIG. 6b illustrates another embodiment of a protocol diagram for a messaging protocol including a data writeback phase inserted before a conflict phase to adhere to proper memory ordering requirements.

Similarly, FIG. 6b, illustrates another embodiment of a protocol diagram utilizing a write-back phase at a conflict phase is illustrated. Here, the protocol flow, one again, is similar to that of FIG. 4b. However, as above in FIG. 6a, in response to performing a partial write to Data and receiving the FrcAckCnflt message from the home node CHL1, producer agent GQ0 performs a writeback of New Data. The conflict phase starting with AckCnflt from GQ0 and ending with Cmp_FwdCode from home node CHL1 does not begin until the completion from CHL1 is received by GQ0 in response to receiving New Data. As a result, the memory ordering of updating data at home node CHL1 before updating the Flag value is enforced, which results in providing accurate/valid New Data to the consumer IOH.

Figure 6C:
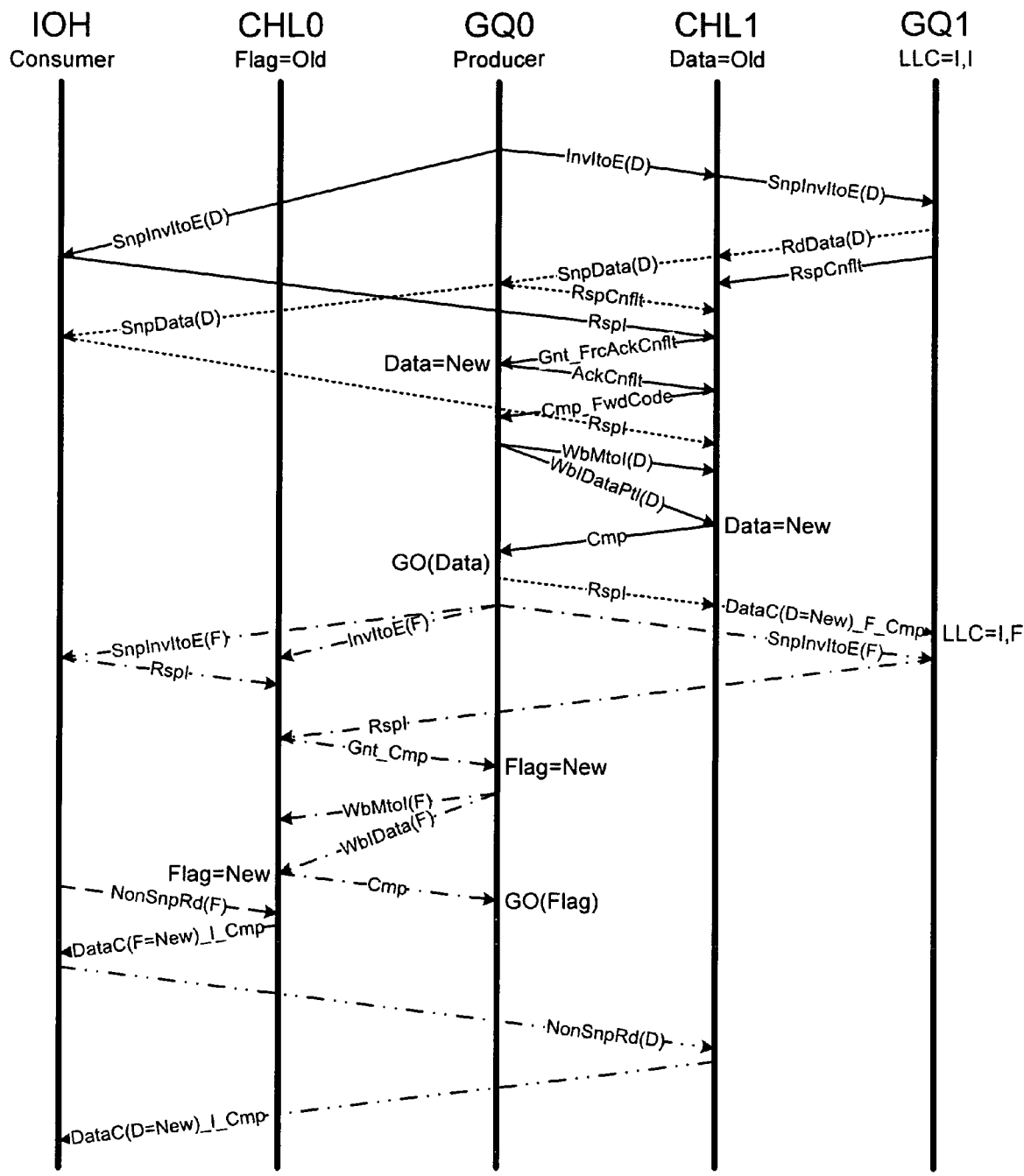
FIG. 6c illustrates another embodiment of a protocol diagram for a messaging protocol including messages in a conflict phase to adhere to proper memory ordering requirements.

Turning to FIG. 6c, another embodiment of a protocol diagram utilizing a write-back phase including write-back of data is illustrated. Here, the write-back phase is similar to that of FIG. 6a; however, the write-back phase is performed later. Yet, here instead of utilizing RspIWb and WbIDataPtl messages, as in FIG. 4a, WbMtoI and WbiDataPtl messages are utilized to write data back. In other words, a write-back phase is utilized at the conflict phase instead of a response phase, which calls for a completion message from the home node CHL1 before GQ0 moves onto the Flag transaction, instead of simple forwarding of the data without a completion from home node CHL1 to GQ0 as in FIG. 4a.

Figure 7A:
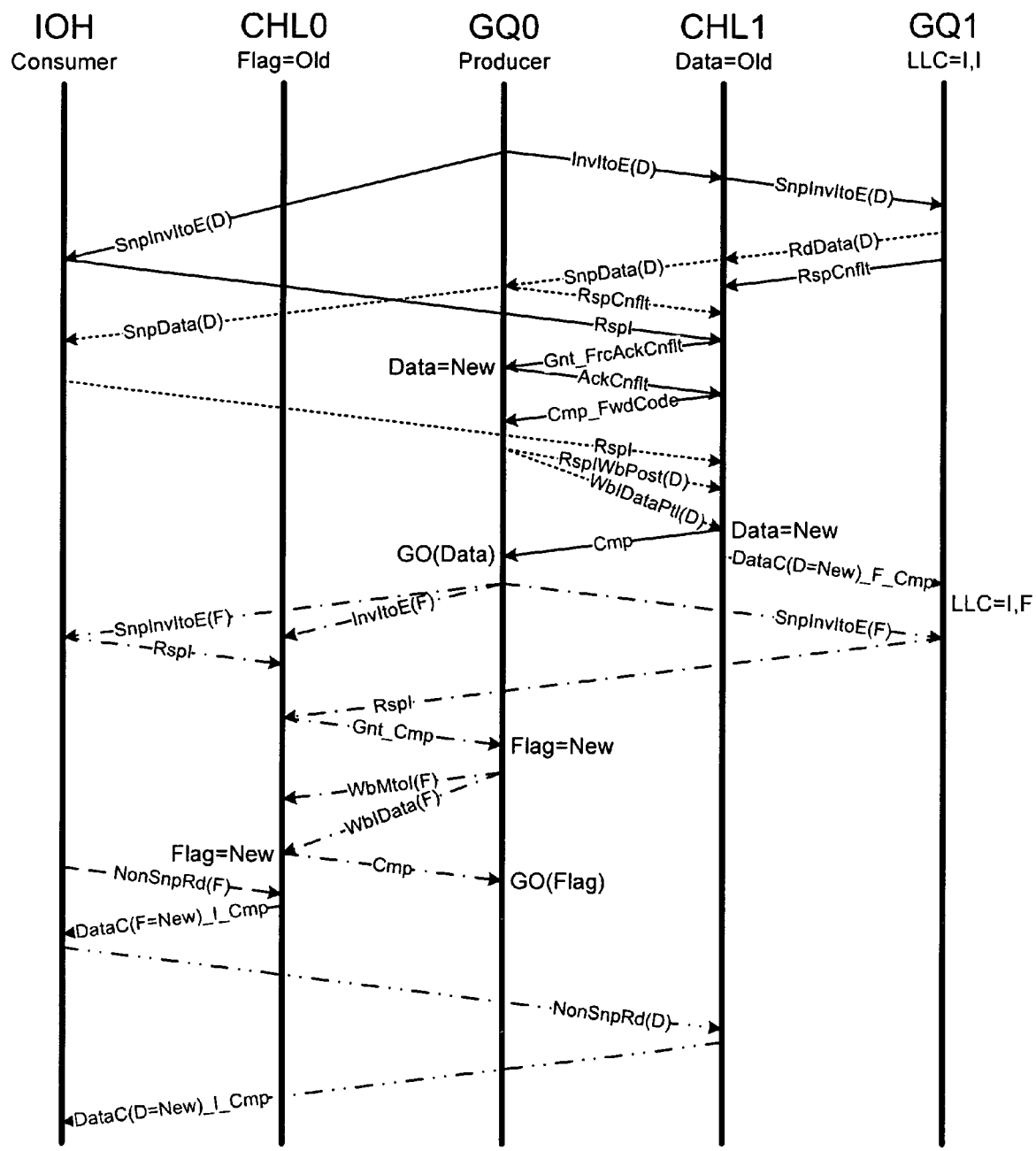
FIG. 7a illustrates an embodiment of a protocol diagram for a messaging protocol including messages after a conflict phase to adhere to proper memory ordering requirements.

Referring to FIG. 7a, an embodiment of a protocol diagram utilizing a postable write message for write-back of data is illustrated. Here, the flow is extremely similar to that of FIG. 6c. However, note that a RspIWbPost(D) marker message is utilized instead of a WbMtoI marker message. Therefore, in one embodiment, the phase initiated by RspIWbPost is referred to as a response phase. However, note the functionality of RspIWbPost, which does not de-allocate GQ0 as having properly responded until a completion signal is received at GQ0 from home node CHL1. As can be seen, in operation, RspIWbPost is more similar to WbMtoI from FIG. 6c, in that GQ0 waits for a completion from home node CHL1 before GQ0 is able to move onto the Flag transaction, than to the RspIWb from FIG. 4a, as GQ0 does not wait for a completion before moving onto the Flag transaction. In other words, RspIWbPost indicates a "postable write" such that the node that transmitted RspIWBPost, GQ0, waits for a completion before being de-allocated. Therefore, in one embodiment, the utilization of a RspIWbPost is referred to as a write-back phase.

Figure 7B:
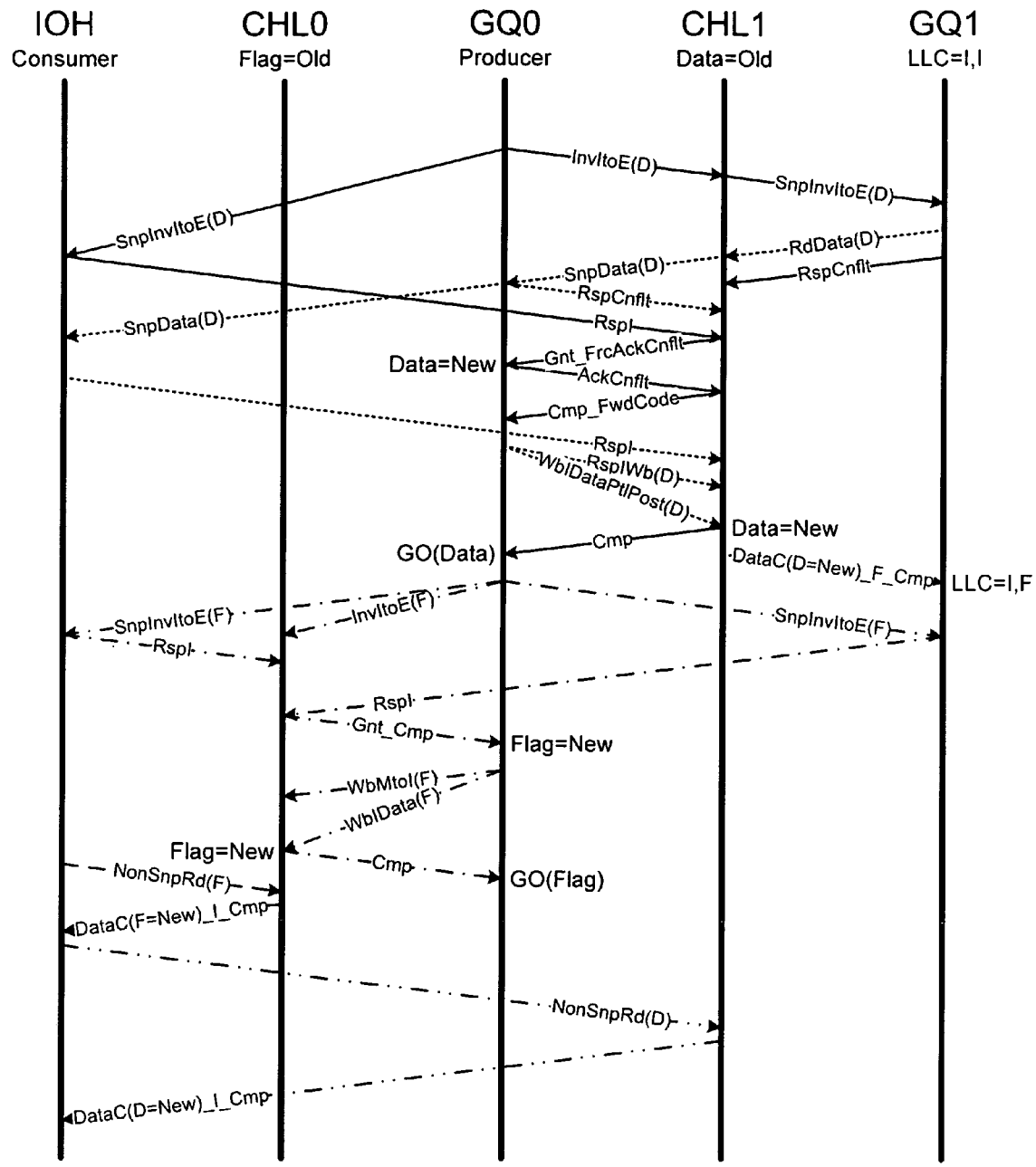
FIG. 7b illustrates another embodiment of a protocol diagram for a messaging protocol including messages after a conflict phase to adhere to proper memory ordering requirements.
Figure 7C:
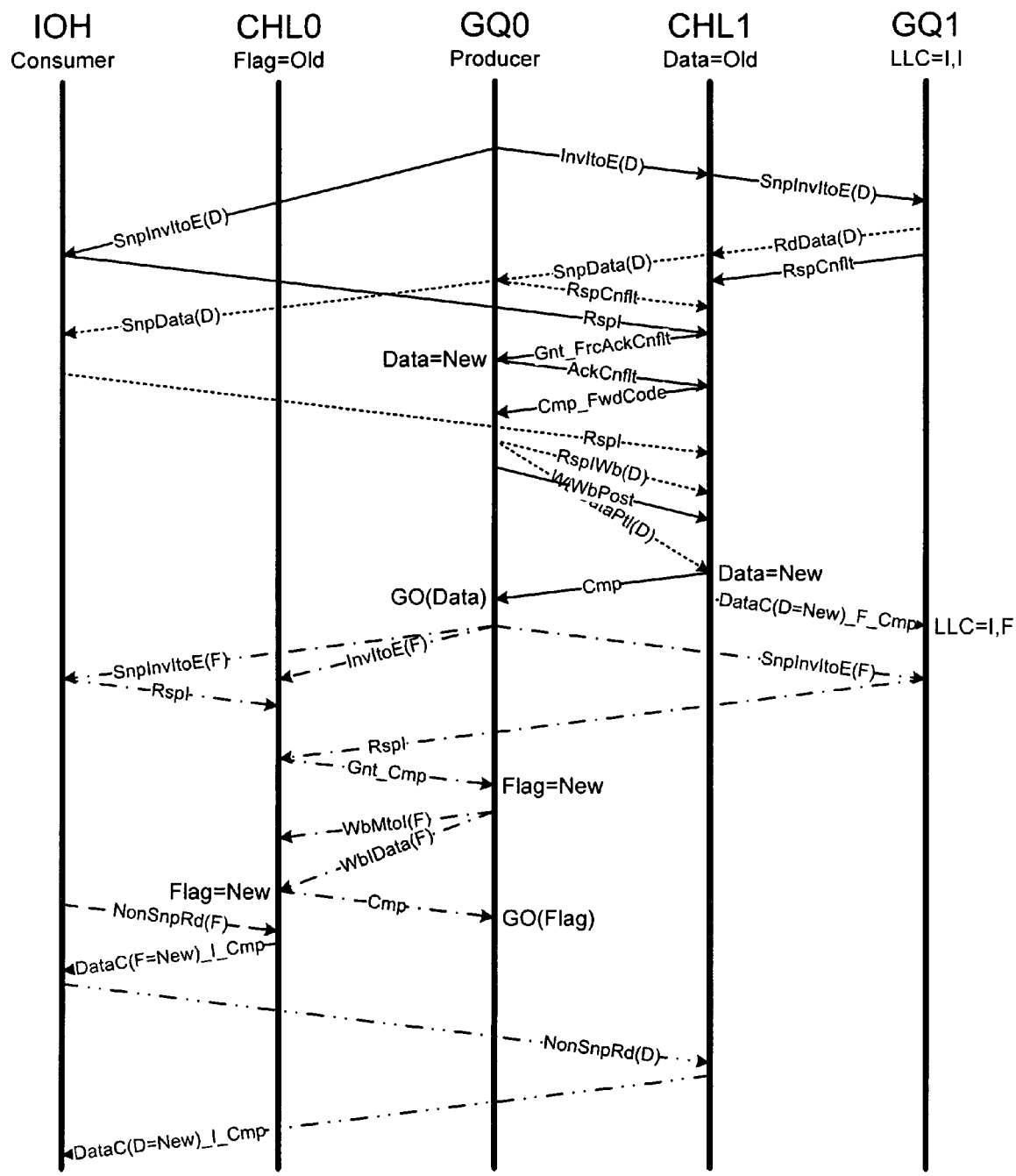
FIG. 7c illustrates another embodiment of a protocol diagram for a messaging protocol including a message after a conflict phase to adhere to proper memory ordering requirements.

Similarly, FIG. 7b illustrates another embodiment of a protocol diagram utilizing a postable write message for write-back of data. Here, note that the "postable write" may be indicated by the data message, WbIDataPtlPost, instead of the marker message RspIWb. Moreover, as depicted in FIG. 7c, a separate message, WbPost, may be utilized to indicate the RspIWb and WbIDataPtl, in one embodiment, are part of a write-back phase, where GQ0 is not de-allocated until a completion from the home node CHL1 is received in response to committing the partial data to memory.

As can be seen from above, in one embodiment, performing, inserting, generating messages for, or initiating a write-back phase at a conflict phase potentially has different temporal relation to the conflict phase. In one embodiment, a write-back phase at a conflict phase includes at the start of a conflict phase, such as an Acknowledge Conflict message combined with a Write-back marker message, i.e. AckCnfltWbi(D). In another embodiment, a write-back phase at a conflict phase includes before a conflict phase, such as after a Gnt_FrcAckCnflt and before an AckCnflt message, i.e. discussion relating to FIGS. 6a and 6b. In yet another embodiment, a write-back phase at a conflict phase includes after a conflict phase, such as after an AckCnflt and Cmp_FwdCode message, i.e. discussion relating to FIGS. 6c through FIG. 7c.

Furthermore, a write-back phase, in one embodiment, refers to write-back messages, such as AckCnfltWbI, WbMtoI, and WbiDataPtl. In another embodiment, a write-back phase also includes response related messages that emulate write-back functionality, such as RspIWbPost, WbIDataPtlPost, and WbPost. As an example, emulating functionality of a write-back phase includes not deallocating a sending agent, or the sending agent waiting, until a completion message for the write-back is received.

Therefore, as can be seen from above, memory ordering may be enforced when partial memory accesses and non-snoop/non-coherent accesses are made, even when a conflict is detected. Therefore, in circumstances, such as when a first agent is waiting on data from a second agent, which sets a flag to indicate to the data is read, the enforcement of proper memory ordering ensures that valid/new data is provided, instead of inconsistent invalid data.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   first logic to perform a partial write to update partial data;
   second logic to initiate a write-back phase at a conflict phase in response to receiving a conflict message associated with the partial data from a home agent for the partial data, wherein the write-back phase is to provide the partial data to the home agent associated with the partial data; and
   third logic coupled to the second logic to provide the partial data to the home agent during the write-back phase, wherein the second logic is to generate a postable write-back message in response to receiving the conflict message associated with the partial data and wherein the postable write-back message includes a message selected from the group consisting of a Response Invalid Write-back Postable (RspIWbPost) message, a Write-back Invalid Data Partial Postable (WbIDataPost) message, and a Write-back Postable (WbPost) message, and wherein the conflict message is selected from a group of messages consisting of: a Grant Force Acknowledge Conflict (Gnt_FrcAckCnflt) message, an Acknowledge Conflict (AckCnflt) message, and a Complete Forward Code (Cmp_FwdCode) message.

2. The apparatus of claim 1, wherein the first and second logic are protocol logic associated with a physical layer of an interconnect architecture layered stack, and wherein the third logic includes physical logic associated with a physical layer of the interconnect architecture layered stack.

3. The apparatus of claim 1, wherein the second logic to initiate a write-back phase at a conflict phase comprises: the second logic to generate an Acknowledge Conflict and Write-back message.

4. The apparatus of claim 3, wherein the second logic to generate an Acknowledge Conflict and Write-back message in response to receiving a conflict message associated with the partial data comprises the second logic to generate the Acknowledge Conflict and Write-back message in response to receiving a Force Acknowledge Conflict message from the home agent.

5. The apparatus of claim 4, wherein the Acknowledge Conflict and Write-back message includes an Acknowledge Conflict Write-back Invalid (AckCnfltWbI) message and the Force Acknowledge Conflict message from the home agent includes a Grant_Force Acknowledge Conflict (Gnt_FrcAckCnflt) message.

6. The apparatus of claim 1, wherein the second logic to initiate a write-back phase at a conflict phase in response to receiving a conflict message associated with the partial data comprises: the second logic to generate a write-back marker message and a write-back data message in response to receiving a conflict message associated with the partial data.

7. The apparatus of claim 6, wherein the write-back marker message includes a Write-back Modified to Invalid (WbMtoI) marker message, the write-back data message includes a Write-Back Invalid Data Partial (WbIpataPartial) message, and the conflict message includes a Grant_Force Acknowledge Conflict (Gnt_FrcAckCnflt) message.

8. The apparatus of claim 7, wherein the conflict message is selected from a group of messages consisting of: a Grant_Force Acknowledge Conflict (Gnt_FrcAckCnflt) message, an Acknowledge Conflict (AckCnflt) message, and a Complete_Forward Code (Cmp_FwdCode) message.

9. An apparatus comprising:
a cache memory including a cache line;
first logic coupled to the cache memory to perform a partial write of partial data to the cache line;
second logic to receive a conflict message from a home node associated with the partial data;
third logic coupled to the second logic to generate a combined message to indicate to the home node an acknowledgement of the conflict message and that the partial data is to be transmitted in a data message in response to the first logic performing the partial write of the partial data and the second logic receiving the conflict message; and
fourth logic coupled to the third logic to transmit the combined message to the home node, wherein the third logic is to wait for a completion message from the home node associated with the AckCnltWb message and the data message before initiating a subsequent transaction and wherein the completion message includes a Complete Forward Code (Cmp_FwdCode) message.

10. The apparatus of claim 9, wherein the combined message includes an Acknowledge Conflict Write-back (AckCnfltWb) message.

11. The apparatus of claim 10, wherein the conflict message includes a Force Acknowledge Conflict (FrcAckCnflt) message.

12. The apparatus of claim 9, wherein the second logic and the fourth logic is associated with physical layer logic of an interconnect layered stack and the third logic is associated with protocol layer logic of the interconnect layered stack.

13. A system comprising:
a peer node including first logic to generate a write-back message to initiate a write-back phase at a conflict phase in response to receiving a conflict message from a home node associated with partial data and the peer node performing a partial write to the partial data;
wherein the home node is to be coupled to the first peer node through a point-to-point link, the home node including second logic to generate a completion message for the write-back phase at the conflict phase in response to receiving the partial data from the peer node during the write-back phase, wherein the first logic included in the peer node is to wait until receiving the completion message for the write-back phase from the home node before initiating a subsequent write transaction and wherein the subsequent write transaction includes updating a Flag to be set to indicate to a second node that the partial data is ready to be retrieved, wherein the second node is to perform a non-snoop read of the Flag, and in response to the Flag being set, the second node is to perform a second non-snoop read of the partial data from the home node.

14. The apparatus of claim 13, wherein the write-back message is selected from a group consisting of an Acknowledge Conflict Write-back message, a Write-back to Invalid message, a Response Write-back Postable message, a Write-back Data Partial Postable message, and a Write-back Postable message.

15. The apparatus of claim 13, wherein the first logic includes protocol logic to implement an interconnect architecture coherence protocol, and wherein the second logic includes protocol logic to implement the interconnect architecture coherence protocol.

16. A method comprising:
updating partial data to new partial data in a peer caching agent;
receiving a conflict message with the peer caching agent associated with the partial data from a home agent associated with the partial data;
generating a write-back message to indicate to a home agent that the new partial data is to be written back to the home agent in response to receiving the conflict message with the peer caching agent;
receiving a completion message from the home agent with the peer-caching agent, after the home agent receives new partial data from the peer caching agent;
generating the conflict message with the home agent in response to receiving a response conflict message at the home agent;
receiving the new partial data from the peer caching agent with the home agent;
committing the new partial data to memory associated with the home agent; and
generating the completion message with the home agent in response to receiving the new partial data with the home agent and committing the new partial data to memory associated with the home agent;
writing to a flag with the peer agent after receiving the completion message from the home agent to set the flag;
performing a non-coherent read of the flag with a second peer agent; and
performing a non-coherent read of the new partial data from the home agent with the second peer agent, in response to the flag being set upon the non-coherent read of the flag with the second peer agent.

17. The method of claim 16, further comprising: writing-back the partial data to the home agent before updating the partial data to the new partial data, in response to the partial data being held in the peer caching agent in a Modified state, wherein updating the partial data to the new partial data is to occur before receiving the conflict message.

18. The method of claim 16, wherein updating the partial data to the new partial data in the peer caching agent is to occur after receiving the conflict message.

19. The apparatus of claim 13, wherein the write-back message is selected from a group consisting of an Acknowledge Conflict Write-back message, a Write-back to Invalid message, a Response Write-back Postable message, a Write-back Data Partial Postable message, and a Write-back Postable message.

20. The apparatus of claim 19, wherein the conflict message includes a Force Acknowledge Conflict message, and wherein the completion message is a completion message or a Completion Forward Code message.

* * * * *

UNITED STATES PATENT AND TRADEMARK OFFICE
CERTIFICATE OF CORRECTION

PATENT NO. : 8,205,045 B2  
APPLICATION NO. : 12/168606  
DATED : June 19, 2012  
INVENTOR(S) : Robert H. Beers et al.

Page 1 of 1

It is certified that error appears in the above-identified patent and that said Letters Patent is hereby corrected as shown below:

In column 16, line 25, in claim 1, delete "Grant Force" and insert -- Grant_Force --, therefor.

In column 16, line 27, in claim 1, delete "Complete Forward" and insert -- Complete_Forward --, therefor.

In column 16, line 60, in claim 7, delete "(WblpataPartial)" and insert -- (WblDataPartial) --, therefor.

In column 17, line 17, in claim 9, delete "AckCnltWb" and insert -- AckCnfltWb --, therefor.

In column 17, line 19-20, in claim 9, delete "Complete Forward" and insert -- Complete_Forward --, therefor.

Signed and Sealed this  
Twenty-fifth Day of September, 2012

David J. Kappos  
*Director of the United States Patent and Trademark Office*